(12) United States Patent
Thoma

(10) Patent No.: US 11,686,423 B2
(45) Date of Patent: Jun. 27, 2023

(54) TOOL FOR REMOVING AND INSTALLING BEARINGS AND METHOD FOR CHANGING A BEARING

(71) Applicant: MAN Energy Solutions SE, Augsburg (DE)

(72) Inventor: Andreas Thoma, Langenneufnach (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 462 days.

(21) Appl. No.: 16/757,848

(22) PCT Filed: Nov. 14, 2018

(86) PCT No.: PCT/EP2018/081214
§ 371 (c)(1),
(2) Date: Apr. 21, 2020

(87) PCT Pub. No.: WO2019/096839
PCT Pub. Date: May 23, 2019

(65) Prior Publication Data
US 2021/0190256 A1  Jun. 24, 2021

(30) Foreign Application Priority Data
Nov. 15, 2017 (DE) .................... 10 2017 126 855.3

(51) Int. Cl.
*F16M 7/00* (2006.01)
*B66F 3/08* (2006.01)
(Continued)

(52) U.S. Cl.
CPC ................ *F16M 7/00* (2013.01); *B66F 3/08* (2013.01); *B63H 21/14* (2013.01); *B63H 21/30* (2013.01); *F16F 1/44* (2013.01); *F16M 5/00* (2013.01)

(58) Field of Classification Search
CPC .... B66F 3/36; B66F 3/08; F16M 7/00; F16M 5/00; B63H 21/14; B63H 21/30; F16F 1/44
(Continued)

(56) References Cited

U.S. PATENT DOCUMENTS 246,409 A * 8/1881 Moore et al. .......... B21D 53/00
29/DIG. 48
2,617,620 A * 11/1952 Jessop ..................... E21D 15/24
248/354.3
(Continued)

FOREIGN PATENT DOCUMENTS

| CN | 105384101 | 3/2016 |
| DE | 102008011035 | 1/2008 |

(Continued)

OTHER PUBLICATIONS

Office Action dated Dec. 4, 2020 issued in Chinese Patent Application No. 201880074276.0.
(Continued)

*Primary Examiner* — Christopher Garft
*Assistant Examiner* — Michael McDuffie
(74) *Attorney, Agent, or Firm* — Cozen O'Connor

(57) ABSTRACT

A tool for disassembling and assembling bearings which support an engine mounting frame of an internal combustion engine, is mounted on a base, a bearing having opposing metal securing plates and a resiliently deformable damping element extending between the securing plates, said tool comprising opposing, parallel mounting plates, each mounting plate being mountable on a securing plate of a bearing to be disassembled or assembled, and comprising a turnbuckle, via which the opposing mounting plates are operatively connected.

10 Claims, 2 Drawing Sheets

(51) Int. Cl.
*B63H 21/14* (2006.01)
*B63H 21/30* (2006.01)
*F16F 1/44* (2006.01)
*F16M 5/00* (2006.01)

(58) Field of Classification Search
USPC .................................. 254/100, 98, 133, 102
See application file for complete search history.

(56) References Cited

U.S. PATENT DOCUMENTS

| | | | | |
|---|---|---|---|---|
| 3,858,846 | A * | 1/1975 | Schmid | E04C 5/163 |
| | | | | 254/100 |
| 4,050,660 | A * | 9/1977 | Eggmann | F01D 25/28 |
| | | | | 248/676 |
| 5,971,362 | A | 10/1999 | Clark | |
| 6,217,005 | B1 | 4/2001 | Scott | |
| 6,328,293 | B1 * | 12/2001 | Olsen | F16F 9/54 |
| | | | | 267/141.1 |
| 6,581,911 | B1 * | 6/2003 | Scott | B66F 3/08 |
| | | | | 254/100 |
| 8,950,724 | B2 * | 2/2015 | Hurst | F01D 25/28 |
| | | | | 244/54 |
| 9,776,550 | B2 * | 10/2017 | Mahaffey | B60P 7/0853 |
| 10,150,659 | B2 * | 12/2018 | Kuttel | F16M 7/00 |
| 11,214,972 | B2 * | 1/2022 | Bayless | E04F 15/02452 |
| 2003/0084557 | A1 | 5/2003 | Whitehead | |
| 2010/0001239 | A1 * | 1/2010 | Dufour | B66F 3/08 |
| | | | | 254/100 |
| 2011/0131893 | A1 * | 6/2011 | Chen | E04G 25/04 |
| | | | | 52/126.6 |
| 2011/0163210 | A1 | 7/2011 | Hendey | |
| 2017/0067262 | A1 * | 3/2017 | Kugler | E04F 15/02476 |

FOREIGN PATENT DOCUMENTS

| | | |
|---|---|---|
| DE | 60314343 T2 | 2/2008 |
| GB | 1551408 | 8/1979 |
| GB | 2187435 | 9/1987 |
| JP | H0680342 | 3/1994 |
| JP | H 09-242722 | 9/1997 |

OTHER PUBLICATIONS

Search Report dated Jun. 14, 2018 issued in German Patent Application No. 102017126855.3.
Office Action dated May 18, 2021 issued in European Patent Application No. 18808245.7.
Office Action dated Jul. 14, 2021 issued in India Patent Application No. 202047019689.
Office Action dated Jul. 6, 2021 issued in Korean Patent Application No. 10-2020-7016372.

* cited by examiner

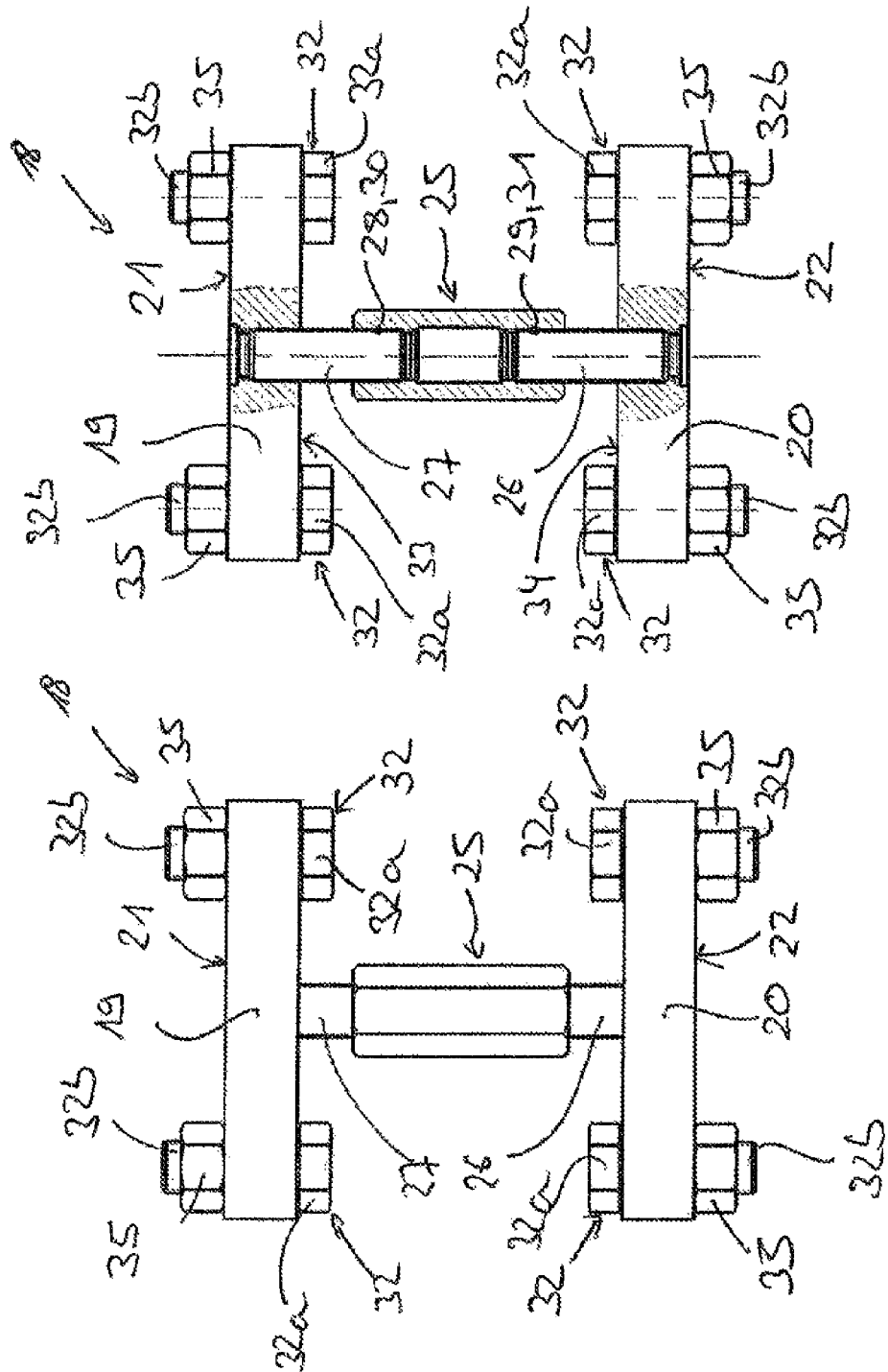

TOOL FOR REMOVING AND INSTALLING BEARINGS AND METHOD FOR CHANGING A BEARING

CROSS REFERENCE TO RELATED APPLICATIONS

This is a U.S. national stage of Application No. PCT/EP2018/081214 filed Nov. 14, 2018. Priority is claimed on German Application No. DE 10 2017 126 855.3 filed Nov. 15, 2017 the content of which is incorporated herein by reference.

BACKGROUND OF THE INVENTION

1. Field of the Invention

The invention relates to a tool for removing and installing bearings. The invention, furthermore, relates to a method for changing a bearing using such a tool.

2. Description of Related Art

From practice it is known that internal combustion engines are mounted on bases. Accordingly, an internal combustion engine of a ship is mounted on a base of the ship by way of an engine mounting frame of the internal combustion engine. Between the engine mounting frame and the base, on which the internal combustion engine is mounted via the engine mounting frame, bearings are positioned which in particular serves for vibration damping. This serves to ensure that vibrations of the internal combustion engine are not transmitted to the base of the ship and thus lead to an undesirable noise development in the ship.

Bearings, via which an engine mounting frame of an internal combustion engine is mounted on a base, typically comprise metallic securing plates located opposite one another and a rubber-elastically deformable damping element extending between securing plates. A first securing plate of a bearing acts on the engine mounting frame and a second securing plate of the bearing on the base. The respective rubber-elastically deformable damping element extends between the securing plates of the bearing. The internal combustion engine supports itself on the bearings via its engine mounting frame, wherein as a consequence of the weight of the internal combustion engine the damping elements of the bearings are elastically deformed. To change a bearing it has been necessary to date to lift the internal combustion engine including the engine mounting frame and thereby take the weight of the internal combustion engine off the bearings. Only then can an old bearing be removed and a new bearing installed.

Lifting the internal combustion engine is laborious. There is a need for simplifying the removal and the installation of a bearing.

SUMMARY OF THE INVENTION

One aspect of, the present invention is based on a new type of tool for removing and installing bearings, which simplifies the removal and installation of bearings. Furthermore, a method for changing a bearing using such a tool is to be created.

The tool according to one aspect of the invention comprises parallel mounting plates located opposite one another, wherein each mounting plate is mountable to a securing plate of a bearing to be removed or installed. The mounting plates located opposite one another are operatively connected by way of a turnbuckle. The tool according to one aspect of the invention allows the removal and the installation of a bearing without it being necessary to lift the internal combustion engine. During the removal and installation of a bearing, the internal combustion engine can remain in its original position and support itself with its weight on bearings not requiring to be changed. With the tool, a bearing to be changed can then be removed in order to install a new bearing following the removal of the bearing to be changed. By way of this, the installation and the removal of bearings are significantly simplified.

Preferentially, the tool comprises coupling rods extending perpendicularly to the mounting plates, wherein with each mounting plate a coupling rod is connected, which extends in the direction of the respective mounting plate located opposite, and wherein the turnbuckle acts on the coupling rods of the mounting plates. This design of the tool is simple and allows a simple removal and installation of bearings without the internal combustion engine having to be lifted for this purpose.

Preferentially, a first coupling rod with a first end of the same acts on a first mounting plate, wherein on a second end of the first coupling rod a first external thread is formed. A second coupling rod with a first end of the same acts on a second mounting plate, wherein on a second end of the second coupling rod a second external thread is formed. A turnbuckle acts with a first end or a first internal thread of the first end on the first external thread of the first coupling rod and with a second end or a second internal thread of the second end on a second external thread of the second coupling rod. The first external thread and the first internal thread are each right-hand threads and the second external thread and the second internal thread are each left-hand treads. This design configuration of the tool is particularly preferred in order to make possible a simple removal and installation of a bearing.

Preferentially, the turnbuckle has a hexagonal outer contour. By way of this, the turnbuckle can then be actuated by a conventional spanner to make possible the removal and the installation of a bearing, namely without the need for lifting and subsequently lowering the internal combustion engine.

Preferentially, the oppositely located mounting plates comprise passage openings for mounting bolts, via which the mounting plates are mountable to the securing plates of a bearing to be removed or installed. This allows simply connecting and disconnecting the tool to and from the securing plates of a bearing to be installed or removed.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

FIG. 1 is a lateral view of a tool according to the invention for removing and installing bearings;

FIG. 2 is the tool of FIG. 1 in partial cross section; and

DETAILED DESCRIPTION OF THE PRESENTLY PREFERRED EMBODIMENTS

Figure 3:
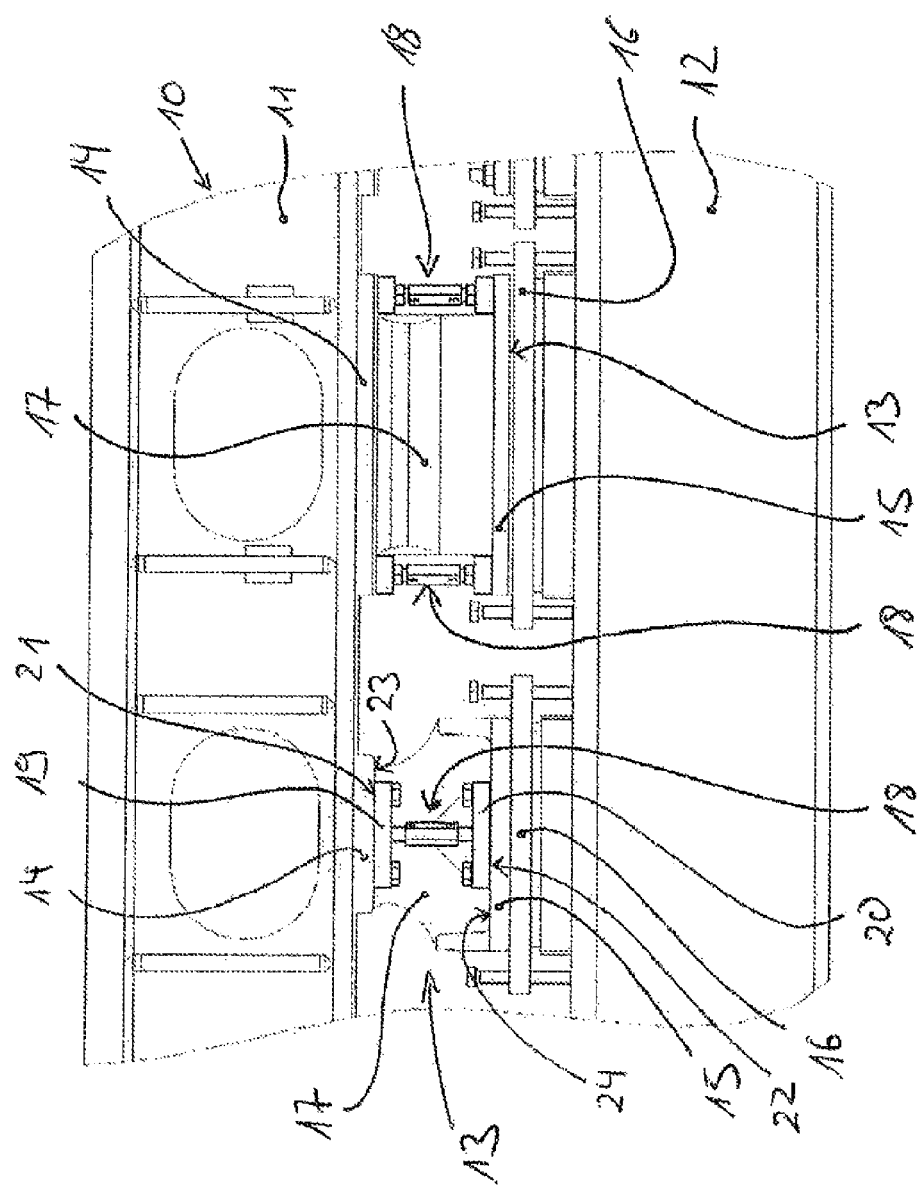
FIG. 3 is the tool of FIG. 1 employed together with an engine mounting frame, a base and bearings between the engine mounting frame and the base.

The invention relates to a tool and to a method for removing and installing bearings, namely of such bearings, via which an engine mounting frame of an internal combustion engine is mounted on a base. In particular, the invention relates to a tool and to a method for removing and installing bearings, via which an engine mounting frame of an internal combustion engine of a ship is mounted on a base of a ship.

FIG. 3 is an extract from an arrangement of an internal combustion engine 10, of which an engine mounting frame 11 is shown, and a base 12, wherein between the engine mounting frame 11 of the internal combustion engine 10 and the base 12, on which the internal combustion engine 10 is mounted, multiple bearings 13 are arranged.

The bearings 13 shown in FIG. 3 comprise metallic securing plates 14, 15 located opposite one another.

By way of a first securing plate 14, the respective bearing 13 is mounted to the engine mounting frame 10.

By way of a second securing plate 15 located opposite, the respective bearing 13 is mounted to the base 12, namely in the shown exemplary embodiment of FIG. 3 to a corresponding mounting pedestal 16 of the base 12.

Between the securing plates 14, 15 of the respective bearing 13, a rubber-elastically deformable damping element 17 of the respective bearing 13 extends, which is rubber-elastically deformed under the weight of the internal combustion engine 10. By way of the damping elements 17 of the bearings 13, the internal combustion engine 10 is decoupled in terms of oscillation or vibration from the base 12, so that vibrations of the internal combustion engine 10 are not transmitted to the base 12.

In particular when for example for changing a bearing 13 an old bearing is to be removed and a new bearing 13 installed, it has been necessary to date to lift the internal combustion engine 10 so that the engine mounting frame 11 does not support itself on the respective bearing 13 to be changed, since otherwise neither the bearing 13 to be removed could be removed nor the bearing 13 to be installed could be installed.

The invention present here now proposes a tool 18 with which a bearing 13 can also be removed and installed even in particular when the internal combustion engine 10 or the engine mounting frame 11 of the internal combustion engine 10 is not lifted off the relevant bearing 13.

Two bearings 13 are shown in FIG. 3, which are installed, offset by 90° between the engine mounting frame 11 and the base 12.

Furthermore, FIG. 3 shows three tools 18 for installing and removing the bearing 13. For installing a bearing 13 and for removing a bearing 13, two tools 18 according to the invention are typically employed for each bearing 13, namely on sides or ends of the respective bearing 13 located opposite one another, wherein in FIG. 3 for the left shown bearing 13 only one tool 18 is visible, the invisible tool 18 is situated behind the left bearing 13 in FIG. 3.

FIGS. 1 and 2 show a tool 18 for removing and installing a bearing 13 according to the invention in sole representation.

The tool 18 according to one aspect of the invention comprises parallel mounting plates 19, 20 located opposite one another. Each of the mounting plates 19, 20 is mountable to a securing plate 14, 15 of a bearing 13 to be removed or installed. As is evident from FIG. 3, the mounting plates 19, 20 are mountable to the securing plates 14, 15 of a bearing 13 in such a manner that outer surfaces 21, 22 of the mounting plates 19, 20 facing away from one another come to lie against inner surfaces 23, 24 of the securing plates 14, 15 of the respective bearing 13 facing one another.

The mounting plates 19, 20 of the tool 18 according to the invention located opposite one another are coupled via a turnbuckle 25 or are operatively connected via the turnbuckle 25. In addition to the mounting plates 19, 20 and the turnbuckle 25, a tool 18 according to the invention comprises coupling rods 26, 27. From each mounting plate 19, 20 of the tool 18, a coupling rod 26, 27 of the tool 18, which is connected to the respective mounting plate 19, 20, extends in the direction of the respective mounting plate 20, 19 of the tool 18 located opposite.

The turnbuckle 25 of the tool 18 acts on the coupling rods 26, 27 of the tool 18.

As is evident from FIGS. 1 and 2, a first coupling rod 27 with a first end acts on a first mounting plate 19. On a second end of the first coupling rod 27 located opposite, a first external thread 28 is formed.

The second coupling rod 26 with a first end acts on the second mounting plate 20 located opposite, while on a second end of the coupling rod 26 located opposite a second external thread 29 is formed.

At a first end, the turnbuckle 25 has a first internal thread 30 that interacts with the first external thread 28 of the first coupling rod 27. At a second end located opposite, the turnbuckle 25 has a second internal thread 31 which interacts with the second external thread 29 of the second coupling rod 26.

The first external thread 28 and the first internal thread 30, which interact, are preferentially right-hand threads whereas the second external thread 29 and the second internal thread 31 are threads running in opposite direction to the first external thread and the first internal thread, i.e. preferentially left-hand threads.

By turning the turnbuckle 25 in a first direction, for example in the clockwise direction, the mounting plates 19, 20, while reducing the distance between the same, can be moved towards one another. By turning the turnbuckle 25 in an opposite direction, for example in the anti-clockwise direction, the mounting plates 19, 20, while increasing the distance between the same, can be moved away from one another.

In order to make possible an optimal turning of the turnbuckle 25, the same has a hexagonal outer contour so that the turnbuckle 25 can then be turned by way of a spanner.

On the mounting plates 19, 20 of the tool 18 according to one aspect of the invention, passage openings for mounting bolts 32 which are not shown are formed. Of these mounting bolts 32, a bolt head 32a and a bolt shank 32b each are visible. The mounting bolts 32 extend in each case, emanating from inner surfaces 33, 34 of the mounting plates 19, 20, through the passage openings of the mounting plates 19, 20, i.e. in such a manner that the bolt heads 32a of the mounting bolts 32 lie on the respective inner surface 33, 34 of the respective mounting plate 19, 20 and the bolt shanks 32b of the mounting bolts 32 project relative to the respective outer surface 21, 22 of the respective mounting plate 19, 20.

In particular when in the state shown in FIGS. 1 and 2 the mounting plates 19, 20 of the tool 10 are demounted from a bearing 13, the mounting bolts 32 are held on the respective mounting plate 19, 20 by way of nuts.

The coupling rods 26, 27 extend perpendicularly to the mounting plates 19, 20 and are firmly connected to the mounting plates 19, 20 with their first ends. The second ends of the coupling rods 26, 27 located opposite, which are in engagement or interact with the turnbuckle 25, are positioned between the two mounting plates 19, 20.

In order to now change a bearing 13, i.e. to exchange an old bearing 13 for a new bearing 13, an old bearing 13 is initially removed and subsequently a new bearing 13 installed. Preferentially two tools 18 are employed for each bearing 13.

For removing an old bearing 13, the turnbuckle 25 of the tool 18 is initially actuated in order to move the mounting plates 19, 20 of the tool 18 towards one another while reducing their distance, so that a distance between the outer surfaces 21, 22 of the mounting plates 19, 20 facing away from one another is smaller than a distance between inner surfaces 23, 24 of the securing plates 15, 16 of the bearing 13 to be removed facing one another, which is still mounted to the engine mounting frame 11 and base 12 typically via bolts. In this state, the tool 18 is positioned between the securing plates 14, 15 of the bearing 13 to be removed.

By actuating the turnbuckle 25 of the tool 18 in the opposite direction, the mounting plates 19, 20, while increasing their distance from one another, are moved away from one another so that the outer surfaces 21, 22 of the mounting plates 19, 20 come to lie against the inner surfaces 23, 24 of the securing plates 14, 15 of the bearing 13, for the purpose of which the nuts 35 have obviously been removed beforehand, just like the mounting bolts 32.

Following this, the mounting plates 19, 20 of the tool 18 are then mounted to the securing plates 14, 15 of the bearing 13 to be removed, namely by way of the mounting bolts 32, which are introduced into the passage openings in the mounting plates 19, 20 of the tool 18 and into corresponding recesses of the securing plates 14, 15 of the bearing 13 to be removed. The securing plates 14, 15 of the bearing 13 to be removed are disconnected from the engine mounting frame 11 and base 12.

Following the disconnecting of the securing plates 14, 15 from engine mounting frame 11 and base 12, the turnbuckle 25 is again actuated namely while reducing the distance between the mounting plates 19, 20 and thus while reducing the distance between the securing plates 14, 15 of the bearing 13 to be removed.

In the process, the damping element 17 of the bearing 13 to be removed and positioned between the securing plates 14, 15 is tensioned more, namely while the rubber-elastically deformable material of the damping element 17 is subjected to greater tension. By way of this, a play between the bearing 13 to be removed and the engine mounting frame 12 and base 13 is provided, so that the bearing 13 can be removed without having to lift the internal combustion engine 10 or the engine mounting frame 11.

Following the removal of the bearing 13 to be removed, a bearing 13 to be installed is inserted between engine mounting frame 11 and base 12 with the help of a tool 18 according to the invention, wherein, as already explained, preferentially two tools 18 according to the invention interact with each bearing during the installation and removal.

To install a new bearing 13 between engine mounting frame 11 and base 12, the mounting plates 19, 20 of the tool 18 are initially mounted to the securing plates 14, 15 of the bearing 13 to be installed, namely in such a manner that the outer surfaces 21, 22 of the mounting plates 19, 20 of the tool 18 with demounted nuts 35 and mounting bolts 32 come to lie against the inner surfaces 23, 24 of the securing plates 14, 15 of the bearing 13 to be installed. In the following, the tool 18 is mounted to the bearing 13 via the mounting bolts 32 in that the mounting bolts 32 extend through the mounting plates 19, 20 of the tool 18 into the securing plates 14, 15 of the bearing 13 to be installed.

Following this, the turnbuckle 25 of the tool 18 is actuated in order to move the mounting plates 19, 20 of the tool 18 towards one another and thus also reduce the distance between securing plates 14, 15 of the bearing 13 to be installed while tensioning the elastically deformable damping element 17 of the bearing 13 to be installed.

This is done until a distance between outer surfaces of the securing plates 14, 15 of the bearings 13 facing away from one another is smaller than a distance between inner surfaces of engine mounting frame 11 and base 12 facing one another or inner surfaces of engine mounting frame 11 and receiving pedestal 16 of the base 12 facing one another. Thus, the bearing 13 can be positioned with play between engine mounting frame 11 and base 12.

Following this, the turnbuckle 25 is actuated in the opposite direction in order to move the mounting plates 19, 20 of the tool 18 and thus the securing plates 14, 15 of the bearing 13 to be installed away from one another so that the outer surfaces of the securing plates 14, 15 of the bearing 13 to be installed come to lie against the inner surfaces of engine mounting frame 11 and base 12.

Following this, the securing plates 14, 15 of the bearing to be installed can then be mounted to the engine mounting frame 11 and base 12. The mounting plates 19, 20 of the tool 18 can be disconnected from the securing plates 14, 15 of the bearing 13 to be installed in order to remove the tool 18 from the bearing 13, if required following the reduction of the distance of the mounting plates 19, 20 while forming a play between the mounting plates 19, 20 of the tool 18 and the securing plates 14, 15 of the bearing 13.

The invention makes possible the installation and removal of bearings 13 without lifting the internal combustion engine.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tool configured to remove and install a bearing comprising metallicsecuring plates located opposite one another and a rubber-elastically deformable damping element extending between the securing plates, via which an engine mounting frame of an internal combustion engine is mounted on a base, comprising: parallel mounting plates located opposite one another each comprises at least one passage opening for mounting bolts, wherein each respective parallel mounting plate has a first side that faces a respective first side of the other parallel mounting plate and is configured to be mounted by a respective second side opposite the first side to a respective securing plate of a bearing to be removed or installed, wherein the passage openings for mounting bolts are configured to mate with threaded holes in the respective securing plates via which the parallel mounting plates are mountable to the respective securing plates of the bearing to be removed or installed such that the second side of each parallel mounting plate is in direct contact with a respective securing plate; and a turnbuckle arranged between the first sides of the parallel mounting plates, via which the parallel mounting plates located opposite one another are operatively connected, wherein a longitudinal axis of the turnbuckle is parallel to a longitudinal axis of the rubber-elastically deformable damping element.

2. The tool according to claim 1, further comprising: coupling rods, wherein each of the parallel mounting plates is connected to a respective coupling rod, which extends in a direction of the respective mounting plate located opposite, wherein the turnbuckle acts on the coupling rods of the parallel mounting plates.

3. The tool according to claim 1, wherein
a first coupling rod with a first end of acts on a first mounting plate, wherein a first external thread is formed on a second end of the first coupling rod;
a second coupling rod with a first end acts on a second mounting plate, wherein a second external thread is formed on a second end of the second coupling rod; and
the turnbuckle acts with a first end via a first internal thread on the first external thread of the first coupling rod and with a second end via a second internal thread on the second external thread of the second coupling rod.

4. The tool according to claim 3, wherein the first external thread and the first internal thread are each right-hand threads and the second external thread and the second internal thread are each left-hand threads.

5. The tool according to claim 1, wherein the turnbuckle has a hexagonal outer contour.

6. The tool according to claim 1, wherein in a state of the tool as demounted from the bearing, the mounting bolts are held on the parallel mounting platesvia nuts.

7. The tool according to claim 6, wherein in a state of the tool as mounted on the bearing, the nuts are removed and the mounting bolts extend through the parallel mounting plates into the securing plates of the bearing.

8. The tool according to claim 2, wherein the coupling rods extend perpendicularly to the parallel mounting plates.

9. A method for changing a bearing, via which an engine mounting frame of an internal combustion engine is mounted on a base, wherein the bearing comprises metallic securing plates located opposite one another and a rubber-elastically deformable damping element extending between the securing plates, having a tool comprising parallel mounting plates located opposite one another, wherein each respective parallel mounting plate is configured to be mounted to a respective securing plate of a bearing to be removed or installed; and a turnbuckle, via which the parallel mounting plates located opposite one another are operatively connected, comprising:
actuating the turnbuckle of the tool to move the parallel mounting plates of the tool towards one another, so that a distance between outer surfaces of the parallel mounting plates of the tool facing away from one another is smaller than a distance between inner surfaces of the securing plates of the bearing to be removed facing one another, which acts on the engine mounting frame and base;
arranging the tool between the securing plates located opposite one another so that the outer surfaces of the parallel mounting plates face the inner surfaces of the securing plates;
actuating the turnbuckle of the tool to move the parallel mounting plates of the tool away from one another so that the outer surfaces of the parallel mounting plates come to lie against the inner surfaces of the securing plates of the bearing to be removed;
mounting the parallel mounting plates of the tool to the securing plates of the bearing and disconnecting the securing plates of the bearing to be removed from engine mounting frame and base;
actuating the turnbuckle of the tool to move the parallel mounting plates of the tool and the securing plates of the bearing to be removed toward one another while tensioning the rubber-elastically deformable damping element of the bearing to be removed; and
removing the bearing to be removed and inserting a bearing to be installed.

10. The method according to claim 9, further comprising:
mounting the parallel mounting plates of the tool to the securing plates of the bearing to be installed;
actuating the turnbuckle of the tool to move the parallel mounting plates of the tool and the securing plates of the bearing to be installed towards one another while tensioning the rubber-elastically deformable damping element of the bearing to be installed, so that a distance between outer surfaces of the securing plates of the bearing to be installed facing away from one another is smaller than a distance between inner surfaces of engine mounting frame and base facing one another;
positioning the bearing to be installed between engine mounting frame and base;
actuating the turnbuckle of the tool to move the parallel mounting plates of the tool away from one another, so that the outer surfaces of the securing plates of the bearing to be installed come to lie against the inner surfaces of engine mounting frame and base;
mounting the securing plates of the bearing to be installed to engine mounting frame and base; and
disconnecting the parallel mounting plates of the tool from the securing plates of the bearing to be installed.

\* \* \* \* \*